United States Patent
Aakolk et al.

(10) Patent No.: US 9,959,319 B2
(45) Date of Patent: May 1, 2018

(54) EVENT DRIVEN DATA STAGING AND DATA AGING ALGORITHMS FOR PERSONALIZATION DATA IN ENTERPRISE SEARCH

(71) Applicant: SAP SE, Walldorf, DE (US)

(72) Inventors: Michael Aakolk, Wiesloch (DE); Frank Michels, Speyer (DE)

(73) Assignee: SAP SE, Walldorf (DE)

( * ) Notice: Subject to any disclaimer, the term of this patent is extended or adjusted under 35 U.S.C. 154(b) by 291 days.

(21) Appl. No.: 14/543,441

(22) Filed: Nov. 17, 2014

(65) Prior Publication Data

US 2016/0140124 A1    May 19, 2016

(51) Int. Cl.
*G06F 17/30* (2006.01)
*G06Q 10/06* (2012.01)

(52) U.S. Cl.
CPC ....... *G06F 17/3053* (2013.01); *G06Q 10/063* (2013.01)

(58) Field of Classification Search
None
See application file for complete search history.

(56) References Cited

U.S. PATENT DOCUMENTS

| | | | | |
|---|---|---|---|---|
| 6,330,546 B1 * | 12/2001 | Gopinathan | ........... | G06Q 20/00 705/35 |
| 2007/0162907 A1 * | 7/2007 | Herlocker | .............. | G06Q 10/10 718/100 |
| 2010/0115211 A1 * | 5/2010 | de la Iglesia | ....... | G06F 11/3485 711/154 |
| 2010/0138370 A1 * | 6/2010 | Wu | ................... | G06F 17/30702 706/12 |
| 2014/0181349 A1 * | 6/2014 | Balkan | ................ | G06F 13/4027 710/310 |
| 2015/0073981 A1 * | 3/2015 | Adjaoute | ........... | G06Q 30/0225 705/39 |
| 2015/0100509 A1 * | 4/2015 | Pappas | .............. | G06F 17/30867 705/319 |
| 2015/0310072 A1 * | 10/2015 | Dietz | ................ | G06F 17/30312 707/741 |

* cited by examiner

*Primary Examiner* — Son T Hoang
(74) *Attorney, Agent, or Firm* — Jones Day (57) ABSTRACT

Each access event for a plurality of business objects is logged. Using the log, a user profile for each of a plurality of users is generated that identifies one or more recently accessed business objects. A relevance value for each business object identified in the user profile is calculated and an aging function is applied to the calculated relevance values. The relevance information can graphically rendered.

21 Claims, 6 Drawing Sheets

| User Object Type X | Day 1 | Day 2 | Day 3 | Day 4 | Day 5 | Day 6 | Day 7 | Day 8 | Day 9 |
|---|---|---|---|---|---|---|---|---|---|
| Obj. A | Click 1 | Click 3 | Click 3 | Click 3 | Click 3 | | | | |
| Obj. A | | | Click 3 | Click 3 | Click 3 | Click 3 | Click 3 | | |
| Obj. A | 1 | 1 | 2 | 2 | 2 | 1 | 1 | 0 | 0 |
| Obj. B | | Click 2 | | Click 4 | Click 2 | Click 2 | | | |
| Obj. B | | | | | Click 4 | Click 4 | Click 4 | Click 4 | |
| Obj. B | | | | | Click 5 | Click 5 | Click 5 | Click 5 | Click 5 |
| Obj. B | 0 | 1 | 1 | 2 | 3 | 3 | 2 | 2 | 1 |

FIG. 3B
300

| User Object Type X | Click on A | Click on B | Click on B | Click on C | Click on E | Click on E | Click on E | Click on B |
|---|---|---|---|---|---|---|---|---|
| Obj. A | 1.0 | 0.8 | 0.6 | 0.4 | 0.2 | | | |
| Obj. B | | 1.0 | 2.0 | 1.8 | 1.6 | 1.4 | 1.2 | 1.0 |
| Obj. C | | | | 1.0 | 0.8 | 0.6 | 0.4 | 1.4 |
| Obj. D | | | | | | | | |
| Obj. E | | | | | 1.0 | 2.0 | 3.0 | 2.8 |
| Obj. F | | | | | | | | |

FIG. 4
400

CLIENT DEVICE
404

CLIENT DEVICE
406

CLIENT DEVICE
408

FIG. 5

EVENT DRIVEN DATA STAGING AND DATA AGING ALGORITHMS FOR PERSONALIZATION DATA IN ENTERPRISE SEARCH

FIELD OF INVENTION

The present invention generally relates to the search of enterprise systems, and more particularly, to the use of personal information to determine the relevance of business objects for a certain user within search results. As an example application, the embodiments may be used to find experts for tasks that are related to certain business object instances or combinations of business object instances. For instance, tracked personal information can be used to determine which employee is best suited to deal with a business opportunity that is related to a certain product, customer, and/or customer contact.

BACKGROUND

In today's hyper information age, it is not uncommon to manage numerous business objects. Many existing applications have been developed to manage a single type of information object. For example, some applications have been developed to manage e-mail messages, calendar entries, tasks, notes, etc. Similarly, some applications have been developed to manage business objects such as purchase orders, sales orders, contracts, service orders, etc. However, existing applications have limited capability to track access of particular business objects and/or related objects. Moreover, access to business objects are not tracked across multiple applications.

In part, existing applications are limited due to the use of multiple devices and applications to access a variety of business objects. Advances in computing technologies have enabled smaller devices, such as mobile phones and tablets, to execute more sophisticated functions and applications. As a result, people often utilize their mobile phones and tablets to perform many of the functions that they previously performed on their personal computers and laptops.

Accordingly, the inventors have provided systems and methods that enable users to search for business objects relevant to particular users. Enterprise search results may be ranked such that that business objects may be displayed according to a calculated relevance value correlated with a user's expectations, interests, and/or business needs.

SUMMARY OF THE INVENTION

Accordingly, embodiments of the present invention are directed to systems and methods for event driven data staging and data aging algorithms for personalization data in enterprise search that substantially obviate one or more problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with a purpose of the present invention, as embodied and broadly described, the systems and methods log each access event for a plurality of business objects, generate a user profile for each of a plurality of users, each user profile identifying one or more recently accessed business objects, calculate a relevance value for each business object identified in the user profile, apply an aging function to the calculated relevance values, and graphically render the relevance information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

DETAILED DESCRIPTION

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

Embodiments of user interfaces and associated methods for using an electronic device are described. In some embodiments, the electronic device is a portable communication device (e.g., a mobile phone or tablet). The user interface may include a touch screen and/or other input/output devices. In the discussion that follows, a portable communications device may be used as an example embodiment. It should be understood, however, that the user interfaces and associated methods may be applied to other devices, such as personal computers and laptops, which may include one or more other physical user-interface devices, such as a keyboard and or mouse.

The electronic device may support a variety of applications, such as telephone, text messenger, and search applications. The various applications that may be executed on the device may use at least one common physical user-interface device, such as a touchscreen. One or more functions of the touchscreen as well as corresponding information displayed on the device may be adjusted and/or varied from one application to another and/or within a respective application. In this way, a common physical architecture of the device may support a variety of applications with user interfaces that are intuitive and transparent. In the discussion that follows, a search application is used as an example embodiment, but it should be understood that the user interfaces and associated methods may be applied to other applications.

By applying a search application according to embodiments of the present disclosure, users will be better equipped to analyze vast amounts of data, and make more informed decision in real-time. The search application of the present disclosure avoids data privacy problems by relying on information already available to user. In addition, the algorithms used to derive business object search results may be executed locally on user's electronic device or on a remote search server. In either case, relationships between users and business objects are less computationally intensive and may be determined more quickly.

The described systems and methods identify business objects based upon a user's profile. The identified business objects may generally be characterized by participants, customers, dates, locations, and/or topics and the like. For example, the present application describes systems and methods to identify and/or suggest business objects by storing information relating to a user's access of a business object.

Figure 1:
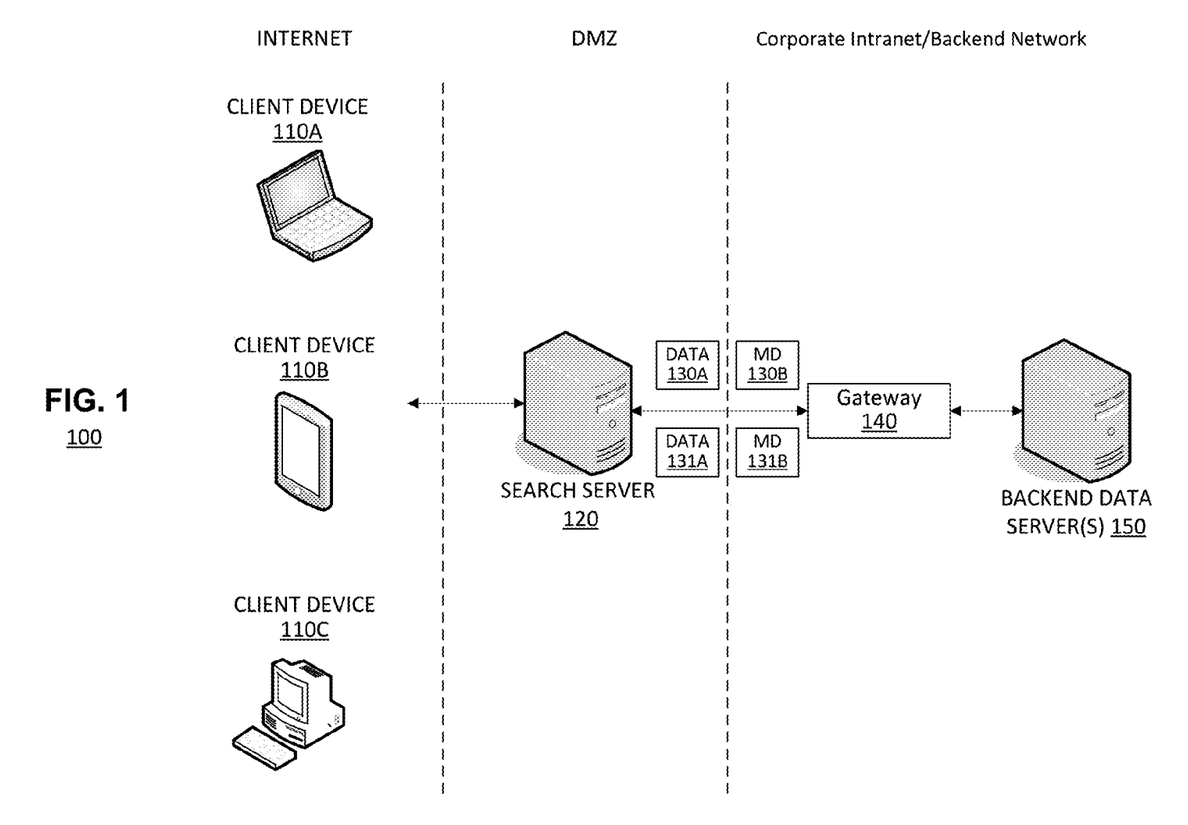
FIG. 1 is a system diagram depicting an architectural overview of a networked system for generating dynamic search results according to an example embodiment.

FIG. 1 is a system diagram depicting an architectural overview of a networked system 100 for generating dynamic search results according to an example embodiment. The system 100 includes client devices 110A, 110B, 110C, search server 120, gateway 140, and backend data server(s) 150. Communications between components of the system 100 may utilize a variety of data transfer protocols, such as HTTP methods (e.g., get, post, put, and delete) or web socket, to query, interact, and manipulate data. In addition, the components of system 100 may be implemented using conventional and/or cloud networks.

As illustrated, the networked system 100 includes one or more client devices such as client devices 110A, 110B, 110C, being network accessible via an Internet connection, and connected to a search server 120 in a network demilitarized zone (DMZ). Collectively, devices such as client devices 110A, 110B, 110C and search server 120 may be referred to as a dynamic frontend system. Client devices 110A, 110B, 110C may include a variety of devices which may include, for example, a mobile device (e.g., mobile phone or a smartphone), a personal computer, a laptop, a tablet, or the like. Each of the client devices 110A, 110B, 110C is configured to transmit and receive data and metadata communications with the search server 120. The data communications (e.g., 130 and 131) may be exchanged with backend data server(s) 150 via optional gateway 140.

The search server 120 may be configured to transmit data 130A, such as a search request, to an enterprise data system such as a backend server 150 in a corporate intranet/backend network. The optional gateway 140 may translate requests, such as search requests included in data 130A, to other proprietary protocols, such as remote function call (RFC). Alternatively, the functions of gateway 140 may be implemented at backend server(s) 150 such that it may directly receive requests. The backend server(s) 150 may be configured to process the request(s), retrieve data and/or perform data operations as an appropriate response to a request, and return a response for transmission back to the gateway 140. Again, the gateway 140 may be used to translate a proprietary protocol. The data response 131, including search results, may be transmitted from gateway 140 (which is located in the backend network) to the appropriate client device 110A, 110B, 110C via search server 120.

Search server 120 may include a data handler adapted to retrieve data and/or metadata from the gateway 140 and/or backend server(s) 150. The metadata may include information about the type of the data (e.g., date, type of input field, read-only/editable, function, etc.) as well as information about the relevance of the data. Using the information gathered from backend server(s) 150, the search server 120 may aggregate data from data server(s) 150. In addition, the search server 120 may instruct a client device 110 to generate and render user interfaces in a dynamic manner.

One or more backend server(s) 150 may store a variety of data and business objects. Example business objects may include transactional information quotations, as purchase orders, sales orders, contracts, service orders, etc. In addition, business objects may be stored within standalone server(s) or may be integrated with customer relationship management (CRM) and/or enterprise resource planning (ERP) systems.

Client devices 110A, 110B, 110C and/or search server 120 may maintain a user profile for each system user. For example, a user profile may track information which may be derived directly from business suite components like objects the corresponding user owns or groups he is allocated to. In addition, the user profile may store data on business objects the user recently accessed. In other words, if a user created, deleted, modified, or even viewed a business object, the user's behavior may be stored within the profile. Using the user profile, search server 120 may rank the search results.

In some embodiments, the user profile may maintain a variety of counters to rank search results. For example, a business object click counter for a user, a business object change counter for a user, a business object enqueue counter for a user may be maintained. Such counters may be stored within interface tables of the search server 120. The data may be used by the search server 120 for the ranking of the results of a certain search execution. In addition, the user profile may include additional information, such as a user's peer group or organization unit.

Additionally, an aging function may be applied to any of the various counters maintained within a user profile. For example, an aging function may be triggered by the passing of time. Here, the search server 120 may only evaluate objects accessed within a predetermined period of time (e.g., the last three weeks). In another example, the aging function may be triggered by the subsequent access of business objects. Here, the search server 120 may only evaluate a predetermined number of business objects recently accessed (e.g., the previous 100 clicks for a respective user).

Gateway 140 may be located between the search server 120 and the backend server(s) 150 to intercept data communications, such as data 130, 131. The gateway 140 acts as a middle party with both client and server functionality to handle communications in both directions. The gateway 140 may perform server functions, such as responding to data requests from client devices 110A, 110B, 110C. Data responses may be included in data 131A. The gateway 140 also performs client functions, such as forwarding incoming data requests from the client device (110A, 110B, 110C) to the backend server(s) 150. The gateway 140 may forward a data request 120 to the backend server(s) 150, and receive a corresponding data response 131. The data response 131 may be relayed to the search server 120 as data 131A and metadata 131B.

After receiving the data response 131 from the gateway 140 (and correspondingly, from the backend server(s) 150), the gateway 140 can append metadata 131B to received data 131. Once the data response 131A, 131B is generated by gateway 140, the data response 131A, 131B may be returned to the client device 110A, 110B, 110C by search server 120. As shown, response data 131A and response metadata 131B may be communicated from the gateway 140 to the search server 120, for communication to the appropriate client device 110A, 110B, 110C.

Data relating to a group of users, such as peer groups, may relate to interactions with a single or multiple backend server(s) 150. Example groups may designate similarly situated users, such as employees of particular business units, managers, occasional consumers, business customers, etc. In another example, groups may be based upon the role of the user (e.g., sales rep, payroll admin, etc.).

The various embodiments may be used to identify experts for tasks that are related to certain business object instances or combinations of business object instances. For instance, user profiles and related counters may be analyzed to determine which employee is best suited to deal with a business opportunity that is related to a certain product, customer, and/or customer contact.

Figure 2:
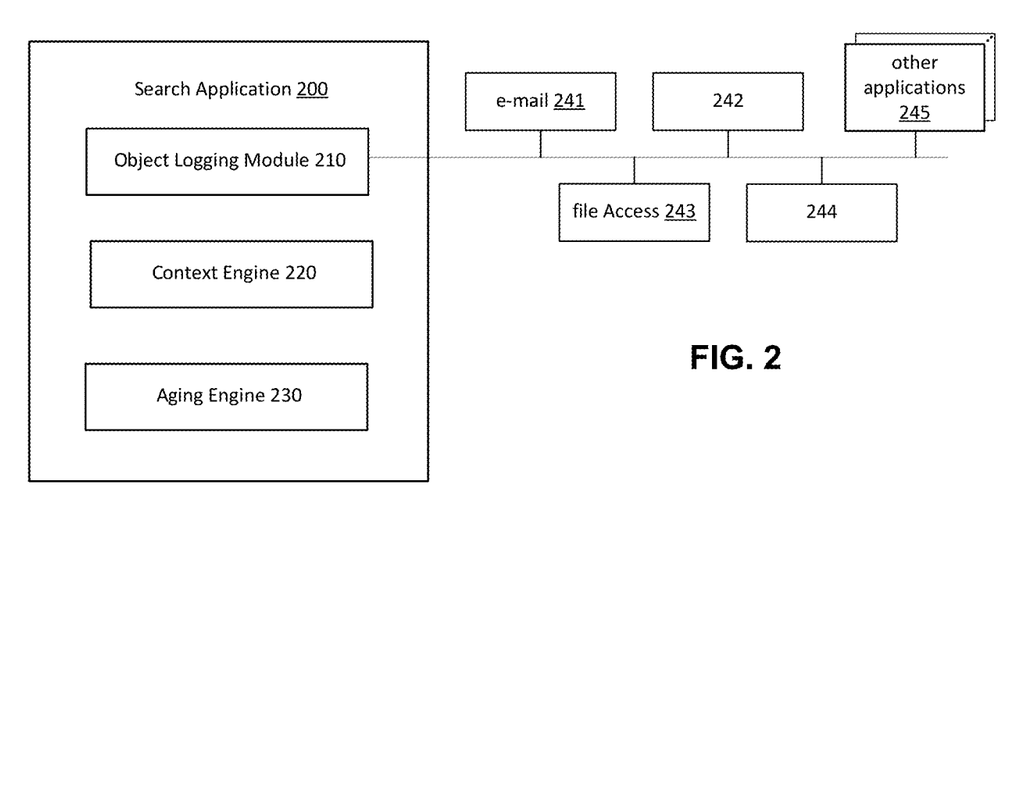
FIG. 2 is a block diagram showing components of a search application according to an example embodiment.

FIG. 2 is a block diagram showing components of a search application according to an example embodiment.

As depicted in FIG. 2, search application 200 includes object logging module 210, context engine 220, and aging engine 230. In addition, the object logging module 210 may be coupled to one or more other applications including e-mail application 241, calendar application 242, file access application 243, document storage 244, and other applications 245.

Object log module 210 stores a variety of data fields related to business objects generated and/or accessed via any of applications 241-245. In addition, object log module 210 may maintain one or more counters for each user or user group to rank search results. Example counters include business object click counter, business object change counter, and/or business object enqueue counter for a user.

In some instances, it may be desirable to filter and/or remove information relating to the individual user. For example, a user search may relate only to particular business object types, or particular customers. In another example, a user may desire to search for business objects of a particular customer for multiple users.

Optional context engine 220 may utilize one or more algorithms to derive one or more related business objects based on information contained within object log module 210. Related business objects may be identified using one or more calculated relevance values. For examples, algorithms within the context engine 220 may compute one or more relevance values for each business object. Thus, a related business object may not have been explicitly accessed by the current user, but may have been identified as business object(s) accessed by users associated with the active business object of the current user.

Aging engine 230 of the search application may apply an aging function to any of the counters maintained within each user profile. Example aging functions evaluate business objects accessed within a predetermined period of time (e.g., the last three weeks) and/or a predetermined number of business objects recently accessed (e.g., the previous 100 clicks for a respective user).

Figure 3A:
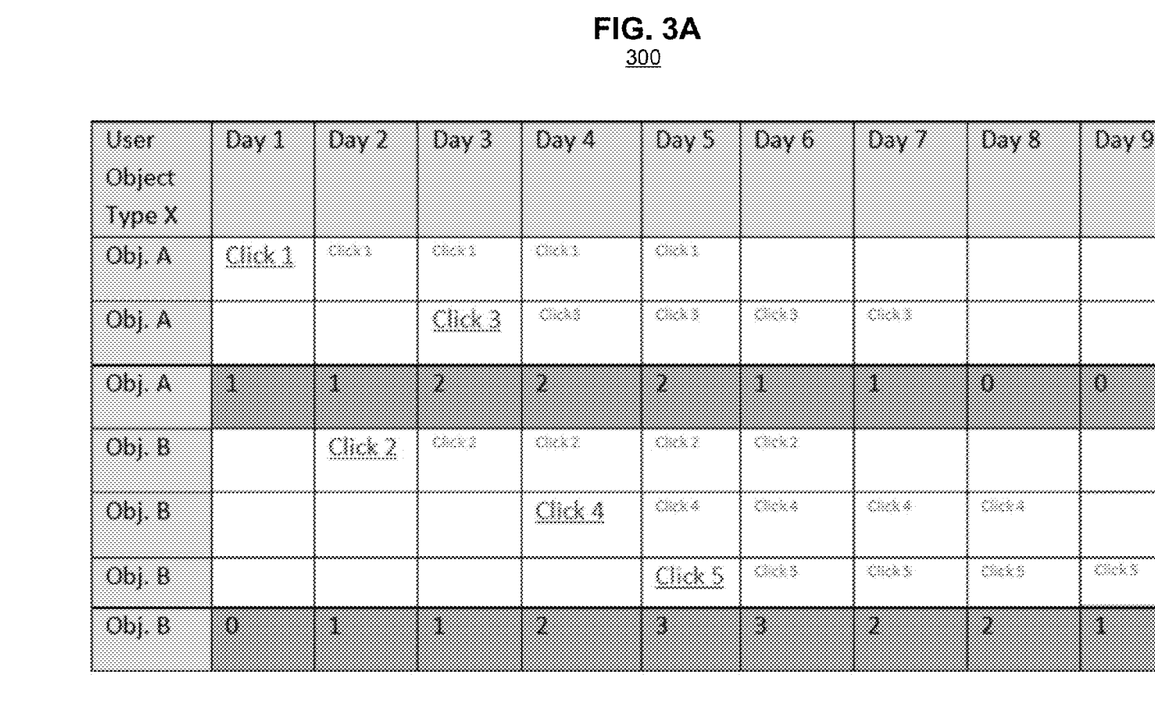
FIGS. 3A and 3B illustrate representative views of example user profiles according to example embodiments.
Figure 3B:
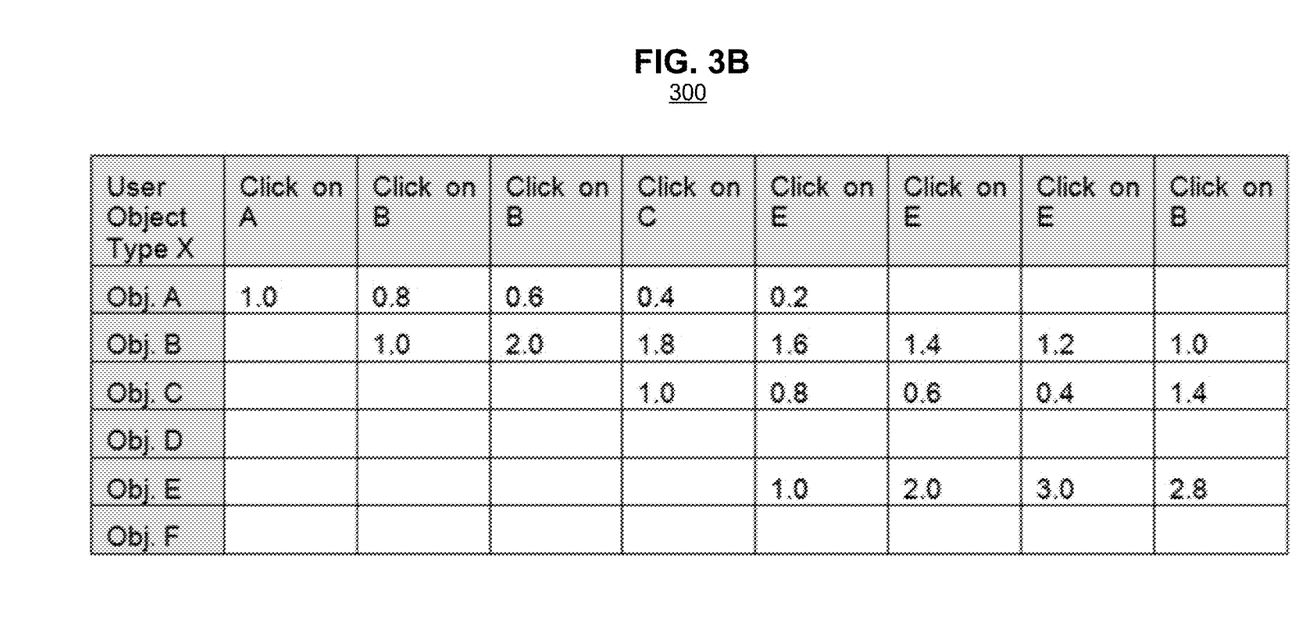

FIGS. 3A and 3B illustrate representative views of example user profiles according to example embodiments.

As shown in FIG. 3A, the passing of the time reduces and/or removes the influence of past business object events (e.g., access of a business object is depicted as "clicks" 1-5).

The example user profile illustrates instances in which either business object A or business object B was accessed by a particular user. When business object A or B is accessed, the user profile is updated such that the access event is aggregated with existing records.

The user profile may include references to business objects and the date in which each business object was accessed. Alternatively, the data of the user profile may be aggregated such that each business object is associated with a relevance value for each time period.

Each access event may be stored in the user profile for a predetermined period of time (e.g., five days). Alternatively, the weight of each access event may be partially reducing on a periodic basis. In some instances, the predetermined period of time for storing business access events may be varied by the user, or may be automatically varied by the search application. By varying the time period, the number of data records stored within a user profile may be reduced, and system performance may be improved.

In some embodiments, the aging functions of the search application may not be applied in the absence of a particular user. For example, if a user is on travel, if the office has a holiday, or if the user is on vacation or sick leave, the aging functions may be suspended until the user returns. In these embodiments, the aging function may be re-triggered by a business object access event.

FIG. 3B illustrates another representative view of example user profiles according to an example embodiment. As shown in FIG. 3B, subsequent business object access events reduce and may eventually remove the influence of past business object events. In the example depicted in FIG. 3B, access of another business object reduces the relevance of previously accessed business objects of the same user by 0.2. Once the relevance of a prior access event reaches zero, it may be deleted from the user profile. Alternately, prior access events may be deleted from the user profile if the relevance value drops below a predetermined threshold (e.g., 0.5). In some embodiments, the search application may store a predetermined number of access events (e.g., 50 access events).

Figure 4:
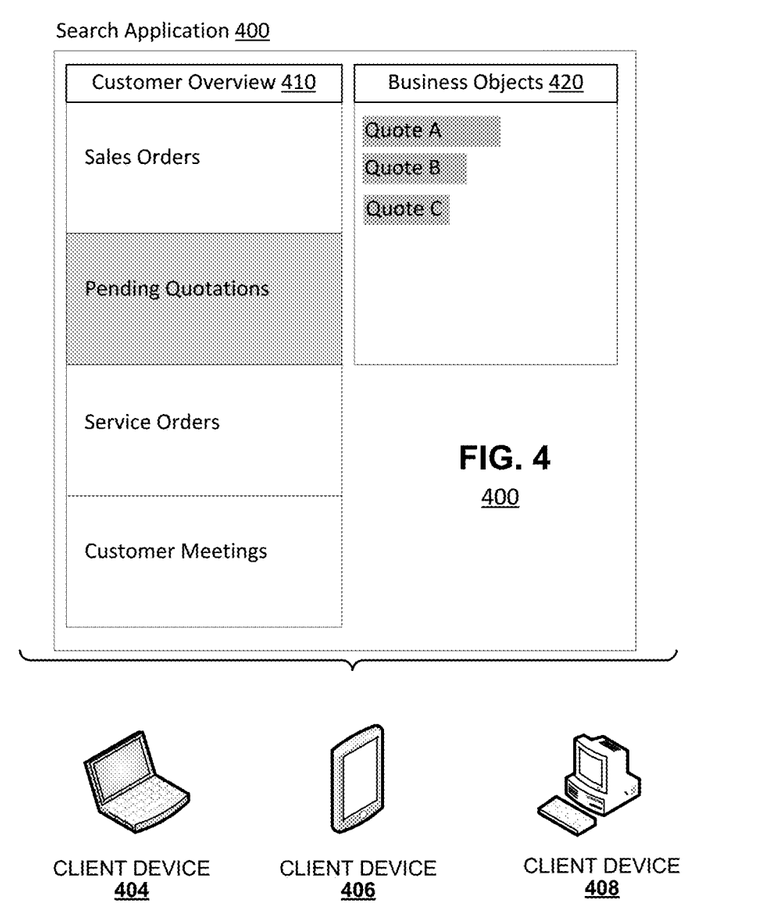
FIG. 4 illustrates representative views of an example search application display according to an example embodiment.

FIG. 4 illustrates representative views of an example search application display 400 according to an example embodiment. The search application 400 may be displayed on a variety of client devices 404, 406, or 408 which may include, for example, a mobile device (e.g., mobile phone or a smartphone), a personal computer, a laptop, a tablet, or the like.

As shown in FIG. 4, the search application 400 includes multiple component sections, such as customer overview section 410 and business object section 420. Sections 410-420 generally incorporate or implement features of the search application, however, the search application and display may further introduce additional modules and/or components.

Within customer overview section 410, a user may select one or more business object types. Upon the user's selection of one or more business object types, relevant business objects as well as their computed relevance may be displayed in business object section 420. Any of the relevant business objects may be accessed by selecting the object from business object section 420.

In some embodiments, one or more bars may be used to depict the relative relevance of each of the listed business objects in business object section 420. Although a bar chart is shown, other graphical representations are also feasible. For example, captions (e.g., above, beneath, when highlighted or selected) may be used to indicate the relative relevance of a particular business object.

Figure 5:
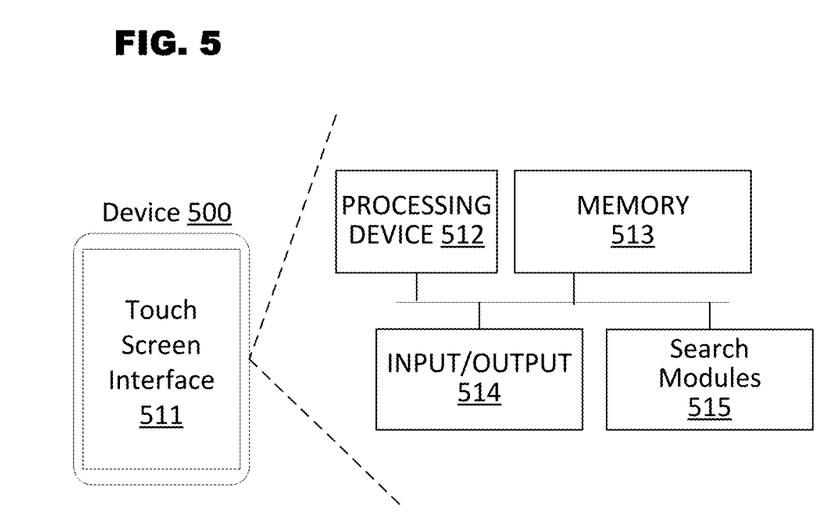
FIG. 5 illustrates a representative architecture of an electronic device according to an example embodiment.

FIG. 5 illustrates a representative architecture of an electronic device according to an example embodiment.

A electronic device 500 may include a touch screen interface 511, processing device 512, memory 513, and input/output module 514. The touch screen interface 511 may include a display, which may be a touch screen, capable of displaying data to a user of the electronic device 500. Electronic device 500 may also include search modules 515 that generally implement the functionality of the business object search application. The components and functions of the search modules 515 are explained in detail with reference to FIGS. 1 and 2.

Although not shown, the touch screen may include a sensor that may be a capacitive touch detection sensor, configured to detect and track movement on the surface and/or in the vicinity of the display. The sensor may be coupled to a signal processing circuit that is configured to identify, locate, and/or track object movement based on the data obtained from sensor. The input/output module 514 manages the functionality of touch screen interfaced 511. For example, input/output module 514 may include functionality for identifying a component section within the business object search application. An alternate component section may be selected by touching the alternate component section.

Memory 513 may include a computer readable medium storing application modules, which may include instructions associated with applications and modules of the electronic device 500.

The electronic device 500 may contain a processing device 512, memory 513, and a communications device (not shown), all of which may be interconnected via a system bus. In various embodiments, the device 500 may have an architecture with modular hardware and/or software systems that include additional and/or different systems communicating through one or more networks via one or more communications devices.

Communications devices may enable connectivity between the processing devices 512 in the device 500 and other systems by encoding data to be sent from the processing device 512 to another system over a network and decoding data received from another system over the network for the processing device 512.

In an embodiment, memory 513 may contain different components for retrieving, presenting, changing, and saving data and may include computer readable media. Memory 513 may include a variety of memory devices, for example, Dynamic Random Access Memory (DRAM), Static RAM (SRAM), flash memory, cache memory, and other memory devices. Additionally, for example, memory 513 and processing device(s) 512 may be distributed across several different computers that collectively comprise a system. Memory 513 may be capable of storing user inputs and preferences as well as customized displays and templates. In some instances, a cache in memory 513 may store calculated changes to the profit per square foot based on modifications to product displays.

Processing device 512 may perform computation and control functions of a system and comprises a suitable central processing unit (CPU). Processing device 512 may include a single integrated circuit, such as a microprocessing device, or may include any suitable number of integrated circuit devices and/or circuit boards working in cooperation to accomplish the functions of a processing device. Processing device 512 may execute computer programs, such as object-oriented computer programs, within memory 513.

The foregoing description has been presented for purposes of illustration and description. It is not exhaustive and does not limit embodiments of the disclosure to the precise forms disclosed. For example, although the processing device 512 is shown as separate from the modules 514 and 515 and the touch screen interface 511, in some instances the processing device 512 and the touch screen interface 511 and/or one or more of the modules 514 and 515 may be functionally integrated to perform their respective functions.

It will be apparent to those skilled in the art that various modifications and variations can be made in the systems and methods for event driven data staging and data aging algorithms for data personalization data in enterprise search of the present disclosure without departing from the spirit or scope of the disclosure. Thus, it is intended that the present disclosure cover the modifications and variations of this disclosure provided they come within the scope of the appended claims and their equivalents.

We claim:

1. A method for implementation by one or more data processors, the method comprising:
   logging, by at least one data processor of the one or more data processors, each access event for a plurality of business objects, the business objects forming part of an enterprise system;
   generating, by the at least one data processor based on the logging, a user profile for each of a plurality of users, each user profile identifying one or more recently accessed business objects;
   calculating, by the at least one data processor, a relevance value for each business object identified in the user profile, the relevance value characterizing the business object of a current user of the user profile which is either explicitly accessed by the current user or accessed by other users associated with the business object of the current user;
   applying, by the at least one data processor, an aging function to the calculated relevance values;
   receiving, by the at least one data processor, a search request;
   determining, by the at least one data processor, a subset of the business objects responsive to the search request;
   applying, by the at least one data processor, the aging function to the subset of the business objects;
   identifying, by the at least one data processor using the generated user profiles of the plurality of user after the application of the aging function to the calculated relevance values and the subset of the business objects, users associated with the subset of the business objects as results responsive to the search request; and
   graphically rendering on a same display, by the at least one data processor and based on the identified results responsive to the search request, the subset of business objects, the identified users, and the calculated relevance value for each business object forming part of the subset of business objects.

2. The method of claim 1, wherein access events include creation, deletion, modification, and viewing of a business object.

3. The method of claim 2, wherein separate counters are maintained for the viewing and modification of the business object.

4. The method of claim 1, wherein the aging function is triggered by the passing of time.

5. The method of claim 1, wherein the aging function is triggered by a subsequent access event.

6. The method of claim 1, wherein the aging function is triggered by the passing of time and a subsequent access event.

7. The method of claim 1, wherein a predetermined number of access events is stored in the user profile for each of the plurality of users.

8. A non-transitory computer readable storage medium storing one or more programs configured to be executed by at least one data processor, the one or more programs comprising instructions for:
   logging, by the at least one data processor, each access event for a plurality of business objects, the business objects forming part of an enterprise system;
   generating, by the at least one data processor based on the logging, a user profile for each of a plurality of users, each user profile identifying one or more recently accessed business objects;
   calculating, by the at least one data processor, a relevance value for each business object identified in the user profile, the relevance value characterizing the business object of a current user of the user profile which is either explicitly accessed by the current user or accessed by other users associated with the business object of the current user;
   applying, by the at least one data processor, an aging function to the calculated relevance values;
   receiving, by the at least one data processor, a search request;
   determining, by the at least one data processor, a subset of the business objects responsive to the search request;
   applying, by the at least one data processor, the aging function to the subset of the business objects;
   identifying, by the at least one data processor using the generated user profiles of the plurality of user after the application of the aging function to the calculated relevance values and the subset of the business objects, users associated with the subset of the business objects as results responsive to the search request; and
   graphically rendering on a same display by the at least one data processor and based on the identified results responsive to the search request, the subset of business objects, the identified users, and the calculated relevance value for each business object forming part of the subset of business objects.

9. The computer readable storage medium of claim 8, wherein access events include creation, deletion, modification, and viewing of a business object.

10. The computer readable storage medium of claim 9, wherein separate counters are maintained for the viewing and modification of the business object.

11. The computer readable storage medium of claim 8, wherein the aging function is triggered by the passing of time.

12. The computer readable storage medium of claim 8, wherein the aging function is triggered by a subsequent access event.

13. The computer readable storage medium of claim 8, wherein the aging function is triggered by the passing of time and a subsequent access event.

14. The computer readable storage medium of claim 8, wherein a predetermined number of access events is stored in the user profile for each of the plurality of users.

15. An electronic device comprising:
   one or more processors; and
   memory storing one or more programs for execution by the one or more processors, the one or more programs including instructions for:
      logging, by at least one data processor of the one or more processors, each access event for a plurality of business objects, the business objects forming part of an enterprise system;
      generating, by the at least one data processor based on the logging, a user profile for each of a plurality of users, each user profile identifying one or more recently accessed business objects;
      calculating, by the at least one data processor, a relevance value for each business object identified in the user profile, the relevance value characterizing the business object of a current user of the user profile which is either explicitly accessed by the current user or accessed by other users associated with the business object of the current user;
      applying, by the at least one data processor, an aging function to the calculated relevance values;
      receiving, by the at least one data processor, a search request;
      determining, by the at least one data processor, a subset of the business objects responsive to the search request;
      applying, by the at least one data processor, the aging function to the subset of the business objects;
      identifying, by the at least one data processor using the generated user profiles of the plurality of user after the application of the aging function to the calculated relevance values and the subset of the business objects, users associated with the subset of the business objects as results responsive to the search request; and
      graphically rendering on a same display by the at least one data processor and based on the identified results responsive to the search request, the subset of business objects, the identified users, and the calculated relevance value for each business object forming part of the subset of business objects.

16. The electronic device according to claim 15, wherein access events include creation, deletion, modification, and viewing of a business object.

17. The electronic device according to claim 16, wherein separate counters are maintained for the viewing and modification of the business object.

18. The electronic device according to claim 15, wherein the aging function is triggered by the passing of time.

19. The electronic device according to claim 15, wherein the aging function is triggered by a subsequent access event.

20. The electronic device according to claim 15, wherein the aging function is triggered by the passing of time and a subsequent access event.

21. The electronic device according to claim 15, wherein a predetermined number of access events is stored in the user profile for the plurality of users.

* * * * *